E. M. CHASE.
RELEASING DEVICE FOR MOTION PICTURE FILM REELS.
APPLICATION FILED JAN. 11, 1921.
1,386,839.
Patented Aug. 9, 1921.
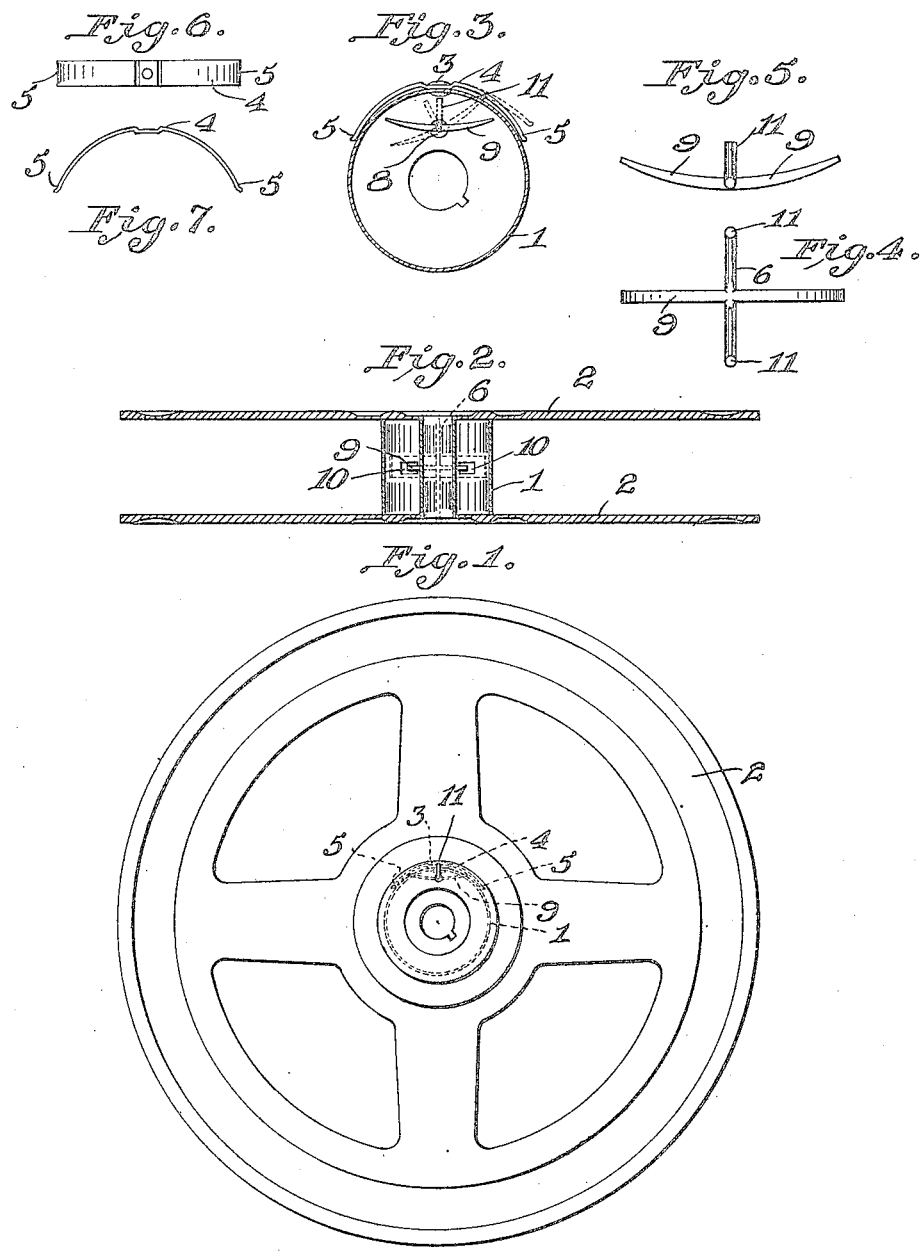
INVENTOR.
ELIJAH M. CHASE
BY
Mason Fenwick & Lawrence
ATTORNEYS

UNITED STATES PATENT OFFICE.

ELIJAH M. CHASE, OF CHEYENNE, WYOMING.

RELEASING DEVICE FOR MOTION-PICTURE-FILM REELS.

1,386,839.  Specification of Letters Patent.  Patented Aug. 9, 1921.

Application filed January 11, 1921. Serial No. 436,493.

*To all whom it may concern:*

Be it known that I, ELIJAH M. CHASE, a citizen of the United States, residing at Cheyenne, in the county of Laramie and State of Wyoming, have invented certain new and useful Improvements in Releasing Devices for Motion-Picture-Film Reels; and I do hereby declare the following to be a full, clear, and exact description of the invention, such as will enable others skilled in the art to which it appertains to make and use the same.

This invention relates to new and useful improvements in motion picture film reels and more particularly to a device for actuating the usual catch member secured to the hub of a motion picture reel for retaining the film in position upon the hub when being wound upon or unwound therefrom, the main object of the present invention being the provision of a device attached to the hub of a motion picture reel whereby the usual spring catch member which is secured to the hub of the reel between the flanges can be readily actuated from the exterior of the reel to release the end of the film which is engaged beneath the end of the spring member or to raise the spring member so that the end of the film can be readily inserted beneath the end of the spring for retaining the same in position while the film is being wound upon the reel.

Another object of the present invention is the provision of an actuating device which can be readily attached to a hub of a motion picture reel and provided with means whereby the same can be readily actuated by the operator from the outside of the reel so that the usual spring member carried by the hub of a moving picture reel can be readily actuated to release or engage the end of a moving picture film.

With the above and other objects in view the invention consists in the novel features of construction, combination and arrangement of parts hereinafter more fully set forth, pointed out in the claims and shown in the accompanying drawings in which:

Figure 1 is a side elevation of a moving picture film reel illustrating my improved device attached thereto;

Fig. 2 is a horizontal section taken through the reel;

Fig. 3 is a transverse sectional view;

Fig. 4 is a top plan view of the actuating member;

Fig. 5 is a side elevation of the actuating member;

Fig. 6 is a plan view of the spring retaining member;

Fig. 7 is a side elevation of the spring retaining member.

Referring now more particularly to the drawings, the numeral 1 indicates the usual hub portion of a moving picture film reel and 2 the side flanges which project outwardly from the hub 1 and which are adapted to retain the film in position upon the hub. In the general construction of these moving picture reels, suitable means is arranged upon the hub for retaining the end of a film in position while the film is being wound upon the reel. This device generally consists of a flat spring member, having its central portion secured to the hub 1 by means of a leaf spring 3 or any other suitable fastening device, each end of the spring member being bent upwardly adjacent the securing point as shown at 4 so that the ends 5 of the spring member will yieldingly engage portions of the hub 1 as clearly illustrated in Fig. 3. Therefore when it is desired to wind a film upon a reel, the end of the film is engaged beneath one end of the spring member to retain the end in position while the film is being wound, this operation generally necessitating the insertion of the hand of the operator between the flanges 2 to raise one of the ends 5 of the spring member so that the end of the film can be readily inserted beneath this end.

In order that the ends of the spring retaining member can be readily actuated to engage the end of a film beneath the same or remove the film therefrom, I provide a transverse rod 6, the ends of which are mounted within suitable openings 8 formed in the end walls of the hub 1 and extending in opposite directions from the center of the rod 6 are the curved arms 9, the ends of which are adapted to be projected through suitable openings 10 in the hub 1 to engage the ends of the spring retaining member and remove from yielding engagement with the hub 1 so that the end of a film may be readily inserted between the ends 5 or removed therefrom.

In order that the rod 6 may be readily actuated from the exterior of the film reel, the ends of the same are bent at right angles to the body of the rod to form suitable handles 11 which can be readily grasped by the operator to rotate the rod 6 and actuate the ends 5 of the spring member. From this it will be apparent that the operator can readily raise the ends 5 of the spring member for inserting the end of the film beneath the same and for releasing the end of the film.

From the above description taken in connection with the accompanying drawings it will be readily apparent that I have provided a simple and durable device adapted to be attached to the hub portion of a motion picture reel for actuating the usual spring retaining means which is used for retaining the end of a moving picture film in position upon the hub of the reel, and it will also be apparent that this device can be attached with very little trouble and at small expense to the well known moving picture reels in use at the present time and with the use of this device the film can be more quickly attached or released from the hub of the reel as it does away with the necessity of the operator inserting his hand between the flanged portions of the reel to actuate the spring engaging member.

I claim:

1. A device of the class described including a spring member secured at its central portion to the periphery of a moving picture reel hub, said spring having upwardly bent portions adjacent its center whereby the ends of the spring will normally engage the periphery of the hub, a rod extending through the hub, curved arms carried by the rod and extending from opposite directions, and means for rotating said rod whereby the ends of said arms will be projected through openings in the hub to engage the ends of the spring and remove them from engagement with the periphery of the hub.

2. A device of the class described including the hub of a moving picture reel, a spring member secured at its central portion to the periphery of the hub and bent upwardly upon opposite sides of its center whereby to normally engage the ends thereof with the periphery of the hub, said hub being provided with openings beneath the ends of the springs, a transverse rod mounted within the hub in line with the securing point of the spring, arcuate arms projecting from opposite sides of the rod, and means connected with the rod and arranged upon the exterior of the hub whereby to manually operate the rod and project the ends of said arms through the openings in the hub to engage the ends of the spring and remove them from the periphery of the hub.

In testimony whereof I affix my signature.

ELIJAH M. CHASE.